(12) United States Patent
Lennert

(10) Patent No.: US 12,501,910 B1
(45) Date of Patent: Dec. 23, 2025

(54) SYSTEM AND METHOD FOR SAUSAGE LINK MAKER

(71) Applicant: Robert A. Lennert, Wild Rose, WI (US)

(72) Inventor: Robert A. Lennert, Wild Rose, WI (US)

( * ) Notice: Subject to any disclaimer, the term of this patent is extended or adjusted under 35 U.S.C. 154(b) by 114 days.

(21) Appl. No.: 18/395,588

(22) Filed: Dec. 24, 2023

Related U.S. Application Data

(63) Continuation-in-part of application No. 29/898,296, filed on Jul. 25, 2023, now Pat. No. Des. 1,008,756.

(51) Int. Cl.
*A22C 11/00* (2006.01)
*A22C 11/10* (2006.01)

(52) U.S. Cl.
CPC .......... *A22C 11/10* (2013.01); *A22C 2011/101* (2013.01)

(58) Field of Classification Search
CPC .. A22C 11/10; A22C 7/00; A22C 5/00; A22C 11/12; A22C 11/005
USPC .......................................................... 452/32
See application file for complete search history.

(56) References Cited

U.S. PATENT DOCUMENTS

| | | | |
|---|---|---|---|
| 1,459,063 A | 6/1923 | Kruse | |
| 1,926,154 A * | 9/1933 | Koc | A22C 11/10 211/11 |
| 2,017,765 A | 10/1935 | Mattheiss | |
| 2,052,092 A | 8/1936 | Hillery | |
| 2,054,875 A | 9/1936 | Corey | |
| 2,163,920 A * | 6/1939 | Standlee | A22C 11/10 452/47 |
| 2,182,181 A * | 12/1939 | Sadoff | B26B 27/00 30/290 |
| 2,282,666 A | 5/1942 | McCue | |
| D161,192 S | 12/1950 | Lebovitz | |
| 2,592,939 A | 4/1952 | Miller | |
| 3,208,099 A | 9/1965 | Heyon | |
| 3,209,396 A * | 10/1965 | Millenaar | A22C 11/104 452/46 |
| 5,453,046 A | 9/1995 | Frame et al. | |
| 7,381,123 B2 | 6/2008 | Bachile | |
| 7,704,131 B1 * | 4/2010 | Malenke | A22C 11/107 452/46 |

OTHER PUBLICATIONS

"Manual Sausage Linker," lemproducts.com. https://www.lemproducts.com/product/sausage-linker?rrec=true [Date accessed: Feb. 22, 2023].

* cited by examiner

*Primary Examiner* — Richard T Price, Jr.
(74) *Attorney, Agent, or Firm* — Bold IP, PLLC; Christopher Mayle

(57) ABSTRACT

A system and method for a sausage link maker, with a board for supporting a sausage while twisting it into even length portions, the board having a plurality of holes for receiving support block elements, the support block elements having a V-shaped cutout for securing sausage links whereby the bottom of the V-shaped cutout is a small aperture for retaining a narrow portion of twisted sausage skin.

6 Claims, 3 Drawing Sheets

SYSTEM AND METHOD FOR SAUSAGE LINK MAKER

CROSS REFERENCE TO RELATED APPLICATIONS

This application is a continuation in part of U.S. patent application Ser. No. 29/898,296 filed on Jul. 25, 2023, which is incorporated in its entirety.

FIELD OF DISCLOSURE

The overall field of this invention relates to sausage link makers, and more particularly a manual device used to twist and create consistent length sausages.

BACKGROUND

Making sausage links involves grinding, mixing, and stuffing meat or other ingredients into casings. While it is a well-established and efficient process, there can still be some challenges or problems that arise during sausage production. Consistency in sausage size, weight, and appearance is important for both quality control and consumer satisfaction. Variability in these factors can be a problem if not properly managed. Current technologies offer inconsistent size and length of homemade sausages. There are two other manual technologies for home use that attempt to solve this problem. One uses string to separate the sausage links. Another is a hand crank machine that costs is complicated to use, and has extra costs for parts. Thus exists the need for a new and improved sausage link maker.

SUMMARY

The present invention is directed to a manual device which is adjustable to aide in creating a consistent length when twisting homemade sausage links. There are three blocks that are mounted on the base which the stuffed sausage casing is rested across to measure and twist sausage links. The distance between blocks is able to be adjusted by choosing different holes on the base to mount them in. This device is made from HDPE plastic, but may be made out of other materials. The device also includes wedge that may be used to pinch the sausage links that are placed between the blocks.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

In the Summary above and in this Detailed Description, and the claims below, and in the accompanying drawings, reference is made to particular features of the invention. It is to be understood that the disclosure of the invention in this specification does not include all possible combinations of such particular features. of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1:
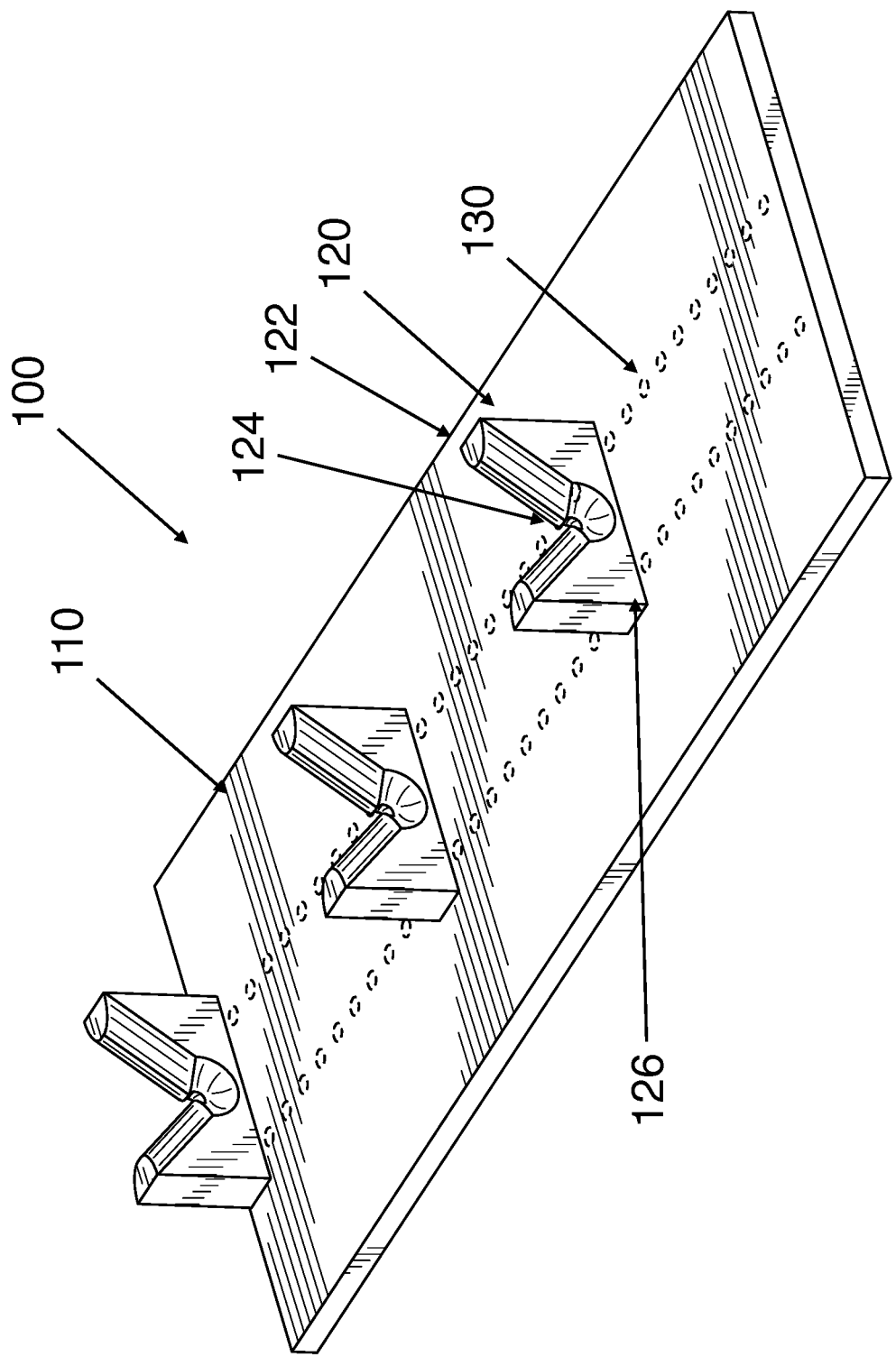
FIG. 1 shows an illustration of the sausage link maker.

Referring now to FIG. 1, FIG. 1 is a physical embodiment of a sausage link maker 100 in accordance with a non-limiting embodiment. Sausage link maker 100 may include a base 110, and one or more blocks 120. Base 110 may be used for supporting blocks while twisting sausages into even length portions. Base 110 may have a rectangular shape; however, this is non-limiting and any shape may be used such as but not limited to a circle, triangle, hexagon, octagon, or other shape. Base 110 may have a plurality of holes 130 or receptacles or other receiving elements at different lengths of the base for receiving support blocks 120 to provide for adjustable length of the sausages when placed on blocks 120. In this embodiment there are two columns of holes 130 whereby the two columns are symmetrical with a center line of the base. However, this is non-limiting and any pattern or amount may be used.

Figure 2:
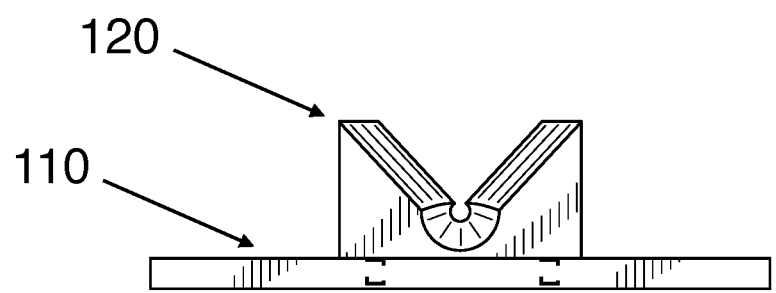
FIG. 2 shows another illustration of the sausage link maker.
Figure 3:
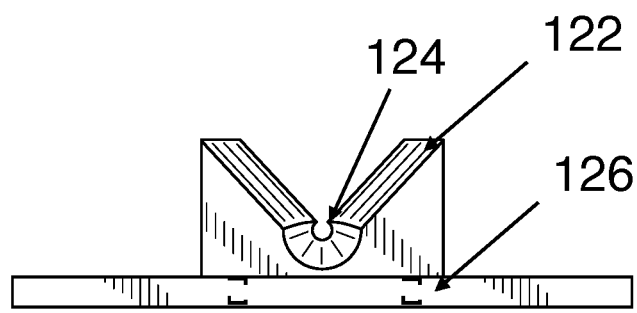
FIG. 3 shows another illustration of the sausage link maker.
Figure 4:
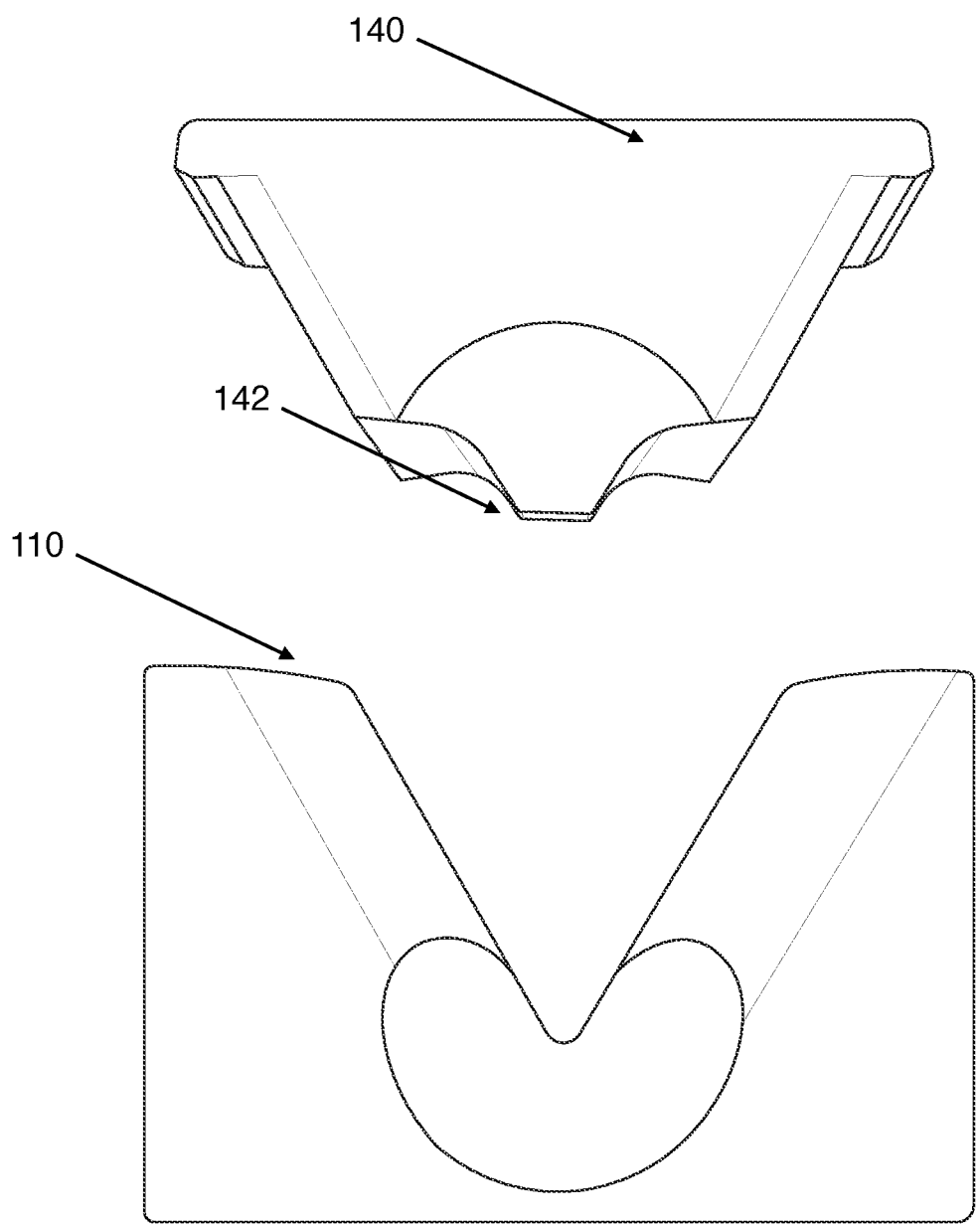
FIG. 4 shows an illustration of the wedge of the sausage link maker.

Blocks 120 may aid in keeping sausage links a consistent length as well as aiding in twisting sausages, as illustrated in FIG. 2 and FIG. 3. Blocks 120 may have a V-shaped cutout 122 for securing sausage links whereby the bottom of V-shaped cutout 122 is a small aperture 124 for retaining a narrow portion of twisted sausage skin. Blocks 120 may have a series of pegs 126 on a bottom surface that are received by holes 130 and are secured by a friction fit. In other non-limiting embodiments, blocks 120 may be connected to base 110 by any number of fasteners such as but not limited to hinges, latches, adhesive, or buckles.

During use, the user places blocks 120 at desired positions on base 110 to create equal sausage link lengths. The user then manipulates the sausage into different links whereby blocks 120 retain a narrow portion of twisted sausage skin.

Sausage link maker 100 may have a wedge 140 with a complimentary shape to blocks 120 whereby wedge 140 may have a v shape. In operation wedge may be pushed down against a block 120 whereby the wedge may have a bottom portion used to cinch and separate the sausage links.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A sausage link maker having one or more blocks and a base, wherein the base has a plurality of receiving elements for receiving the one or more blocks at different lengths of the base, wherein the one or more blocks have two slanted walls that lead towards each other and downward into a semicircular or rounded bottom section.

2. The sausage link maker of claim 1, wherein the semicircular or rounded bottom section extends outwards laterally from a bottom of both of the slanted walls.

3. The sausage link maker of claim 1, wherein the plurality of receiving elements are holes and the or more blocks have a series of pegs at a bottom of the one or more blocks to be positioned downward into the holes.

4. A method for using a sausage link maker, the method comprising:

placing sausage on the sausage link maker, the sausage link maker having one or more blocks and a base, wherein the base has a plurality of holes that receive the one or more blocks at different lengths of the base; and manipulating sausage into sausage links where the one or more blocks retain a narrow portion of twisted sausage skin;

adjusting the one or more blocks to be in different holes of the plurality of holes of the base; and using a wedge to pinch the sausage links, the wedge having a v shape and a blade.

5. A sausage link maker comprising: one or more blocks;

a base, wherein the base has a plurality of receiving elements for receiving the one or more blocks at different lengths of the base; and a wedge to pinch a sausage link when placed into a block.

6. The sausage link maker of claim 5, wherein the wedge has a v shape and a blade.

* * * * *